United States Patent
Hoang et al.

(10) Patent No.: US 7,769,789 B2
(45) Date of Patent: Aug. 3, 2010

(54) HIGH PERFORMANT ROW-LEVEL DATA MANIPULATION USING A DATA LAYER INTERFACE

(75) Inventors: Thuvan Hoang, Santa Clara, CA (US); Anthony Giardullo, San Mateo, CA (US); Amit Ganesh, San Jose, CA (US); Nimar S. Arora, Union City, CA (US); Dheeraj Pandey, Santa Clara, CA (US); Lik Wong, Union City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 362 days.

(21) Appl. No.: 11/801,930

(22) Filed: May 11, 2007

(65) Prior Publication Data
US 2008/0281846 A1      Nov. 13, 2008

(51) Int. Cl.
*G06F 7/00*      (2006.01)
(52) U.S. Cl. ..................................................... 707/803
(58) Field of Classification Search ........................ None
See application file for complete search history.

(56) References Cited

U.S. PATENT DOCUMENTS

| | | | | |
|---|---|---|---|---|
| 5,812,840 A | * | 9/1998 | Shwartz | 707/4 |
| 6,192,370 B1 | * | 2/2001 | Primsch | 707/103 R |
| 7,287,034 B2 | * | 10/2007 | Wong et al. | 707/101 |
| 7,461,053 B2 | * | 12/2008 | Trappen et al. | 707/3 |
| 2003/0004952 A1 | | 1/2003 | Nixon et al. | |
| 2003/0229625 A1 | * | 12/2003 | Melchior et al. | 707/3 |
| 2005/0055381 A1 | * | 3/2005 | Ganesh et al. | 707/200 |
| 2005/0203962 A1 | * | 9/2005 | Zhou et al. | 707/200 |
| 2006/0242104 A1 | * | 10/2006 | Ellis et al. | 707/1 |
| 2008/0281846 A1 | * | 11/2008 | Hoang et al. | 707/101 |

* cited by examiner

*Primary Examiner*—John R. Cottingham
*Assistant Examiner*—Mohammed R Uddin
(74) *Attorney, Agent, or Firm*—Hickman Palermo Truong & Becker LLP; Deborah L. Caswell

(57) ABSTRACT

Performing an operation directly on data stored in a database table provides for avoiding generation and processing of SQL statements. A Data Layer interface, comprising a set of APIs, allows internal database server components to call directly to the Data Layer for making fast row changes to a table. According to an embodiment, before making any row change to a table through this Data Layer interface, a shared state data structure is created to hold the metadata about the table. A single shared state can be used for all DML changes to a particular table regardless of what columns are updated or inserted during each DML operation. When a process needs to change a row, the process uses a mutable state based on the shared state of the table.

24 Claims, 3 Drawing Sheets

HIGH PERFORMANT ROW-LEVEL DATA MANIPULATION USING A DATA LAYER INTERFACE

FIELD OF THE INVENTION

This application relates generally to data management and, more specifically, to techniques for directly manipulating data in a database.

BACKGROUND

A database system comprises one or more database servers that manage a database. A server, such as a database server, is a combination of integrated software components and an allocation of computational resources, such as memory, and processes on a computer for executing the integrated software components on a processor of the computer, the combination of the software and computational resources being dedicated to performing a particular function on behalf of one or more clients. Among other functions of database management, a database server governs and facilitates access to a particular database, processing requests by clients to access the database.

In a database system, end-users make row changes by submitting SQL (Structured Query Language) statements to a database system, which executes the statement. (Note, SQL as used herein refers not only to ANSI standards for SQL, but also proprietary forms and standards of SQL) Typically, when a SQL statement is executed, a database server parses and analyzes the statement to generate an execution plan. This plan may be cached and is re-used later when an identical statement is executed subsequently.

Within a database system, there are many internal software components or applications that change data in the database. Such components, like end-users, also issue SQL statements within the database system to make changes to the data. For example, in a replication sub-system, row changes made at the source database must be replicated at a destination database. Typically, the row changes are captured in a log. The log is read to construct SQL statements to issue to a destination database system to make the same changes at the destination database system.

To execute an SQL statement, the SQL statement is parsed and analyzed and an execution plan is generated. These operations entail a significant amount of processing. While such overhead may be avoided by using a cached execution plan, the execution plans can only be re-used for identical statements. It is therefore desirable to eliminate in another way the overhead attendant to making database changes.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS OF THE INVENTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview of Embodiments

Techniques are described for performing an operation directly on data stored in a database table, foregoing generation and processing of DML statements, such as SQL statements that include the INSERT, DELETE, UPDATE, UPSERT, and SELECT commands. A new Data Layer interface, comprising a set of APIs, allows internal database server components (e.g., Replication, OCI, and PL/SQL) to call directly to a Data Layer for to retrieve and change database data without need for issuing an SQL statement to effect the change. The Data Layer interface supports inserting, updating, deleting and selecting a row, which correspond to the same named commands defined by SQL. As with SQL-based operations, the Data Layer interface maintains the same ACID (Atomicity, Consistency, Isolation, and Durability) properties while performing operations via the Data Layer interface.

Performing operations within a database server often entails invoking multiple layers software. A layer is set of software modules that perform a functionality that has been dedicated (at least to extent) within a database server to the set of software modules. Executing an operation typically involves calling multiple layers of software, with one layer making a call to another layer, which during the execution of the first call, calls another layer. For example, to execute an SQL statement that updates a row in a table, an SQL layer is invoked. The SQL layer analyzes and parses and executes the statement. During execution of the statement, the SQL layer calls modules within the Data Layer to retrieve a particular row from a table and to update a particular in a table.

Example Operating Environment

Figure 1:
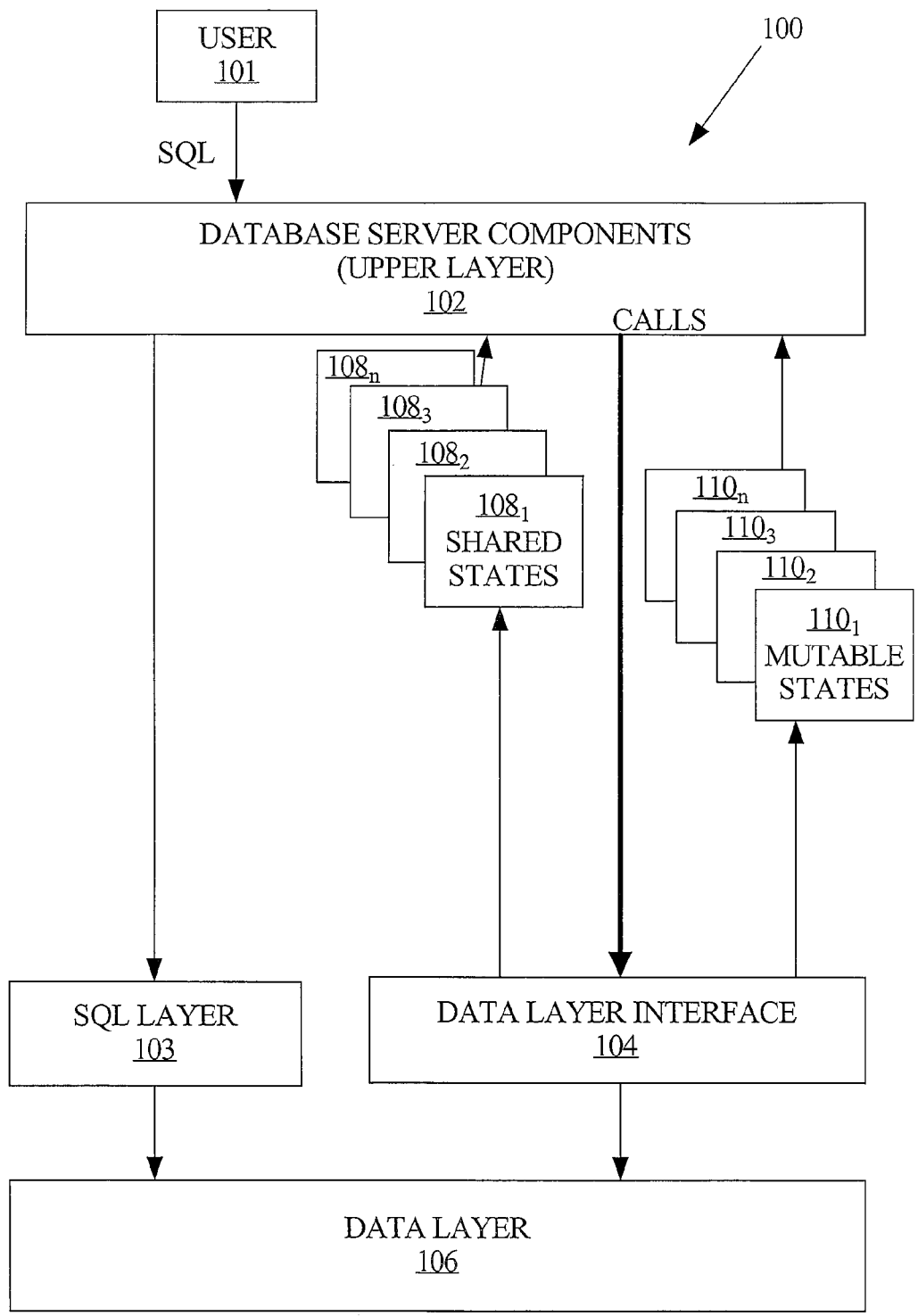
FIG. 1 is a block diagram illustrating an example operating environment 100 in which an embodiment of the invention may be implemented.

FIG. 1 is a block diagram illustrating an example operating environment 100 in which an embodiment of the invention may be implemented. Operating environment 100 generally depicts layers of a database server in a database system. Operating environment 100 comprises upper layer database server components 102 (herein "DBMS components 102") that interact with a Data Layer 106 via a SQL Layer 103 and/or a Data Layer Interface 104.

Data Layer 106 is responsible for handling requests to retrieve and modifying a specific table or index. For example, Data Layer 106 is called to select (retrieve) a particular column in a particular row identified by a row-id, to retrieve a row that has a particular value in a particular column, to access an index to retrieve row-ids of rows that have a particular key value in the key column of the index, to insert or delete a row in a specific table. Data Layer 106 may directly access or change data blocks and/or files that hold database data, or call another layer responsible for such functionality.

SQL Layer 103 receives SQL statements, analyzes and parses the statements, and may generate an execution plan and execute the plan. During execution of the plan, SQL Layer 103 calls Data Layer 106 to access and change particular tables and indexes. SQL layer does not have interact with Data Layer 106 via Data Layer Interface 104

DBMS components 102 make calls into Data Layer Interface 104. Data Layer Interface 104 is an API that comprises routine or functions that may be invoked to execute functionality of Data Layer 106 for inserting, updating, deleting and selecting rows and columns and accessing and modifying indexes of tables. To perform such operations, the caller invokes Data Layer Interface 104, passing a shared state (also referred to herein as "shared state data structure") and a mutable state (also referred to herein as "mutable state data structure"), which are explained in further detail below. When Data Layer Interface 104 is invoked to perform a particular DML operation, a particular function or routine for that operation is called. The Data Layer Interface 104 may include, for example, a set of functions for inserting rows and different set of functions for updating rows and a different set of functions for selecting rows.

DBMS components 102 generally comprise any integrated set of modules internal to a database server. Non-limiting examples of such DBMS components 102 include a PL/SQL module, an OCI module, a replication module, etc.

Shared State

Referring to FIG. 1, a shared states $108_{1-n}$ comprises shared states, each of which is a shared data structure containing metadata about a table. According to an embodiment, before invoking Data Layer Interface 104 to access a table or index, a shared state is created to hold the metadata about the table, such as metadata about the table's columns and index information. A single shared state can be used for multiple invocations of Data Layer Interface 104 that request a particular DML operation to a particular table regardless of what columns are required for each invocation. Using an SQL statement to make the same changes requires generating and processing different statements, each of which may require compiling a different execution plan.

A shared state can be shared among multiple sessions and/or processes and, therefore, a shared state need not be recreated for each of multiple sessions. The metadata associated with a shared state comprises, for non-limiting examples, information identifying the columns of the corresponding table and the size and data types associated with the columns, information about what indexes (if any) and types of indexes are built on the table(s) and what columns the indexes cover, and the like.

According to an embodiment, to generate a shared state a function of Data Layer Interface 104 is called, passing in a parameter identifying a table. The function generates the shared state and returns a pointer to the shared state. The pointer may be opaque.

Mutable State

A mutable states $110_{1-n}$ comprise mutable states, each of which is a session-private data structure used to perform a particular type of DML operation on a table. A mutable state is not shared among multiple sessions but is private to a particular session, and can be altered during execution time. According to an embodiment, a mutable state is based on a corresponding shared state. Thus, each different session could request creation of a mutable state from scratch rather than sessions using a shared state from which to generate a private mutable state. According to an embodiment, a mutable state corresponds to a particular type of DML operation, such as insert, update, delete, select operation. Select operations may include an index scan or probe and table fetch. Each type of operation may have different memory and data structure requirements.

Additionally, according to an embodiment, a mutable state further comprises allocated memory for performing the corresponding type of DML operation. Thus, if an operation is repeated, memory is already allocated for data structures needed for the operation. For example, the mutable state contains shared state by storing a pointer to the corresponding share state. For each column(s) specified in a table metadata stored in the shared state, the mutable state has memory allocated for a data structure holding new and/or old values for a particular type DML operation. Additional memory is allocated for storing intermediary results while performing the corresponding operation.

According to an embodiment, there are five types of mutable states:

(1) Insert mutable state, used to insert a row;
(2) Update mutable state, used to update a row;
(3) Delete mutable state, used to delete a row;
(4) Index fetch mutable state, used to fetch a row id from on an index; and
(5) Table fetch mutable state, used to scan the table.

Further Data Layer and Interface Details

As with SQL-based operations, the Data Layer 106, which includes a transaction layer, maintains the ACID (Atomicity, Consistency, Isolation, and Durability) properties of data and data transactions while performing operations via the Data Layer Interface 104. The Data Layer Interface 104 also provides APIs to query an index to get the row id based on a single key or a range scan. The returned row id can then be passed to either the update or delete or select API to update or delete or select that row. Additionally, the Data Layer Interface 104 provides table scanning APIs for scanning the entire table or fetching a row based on a row id.

According to an embodiment, the Data Layer Interface 104 operates to perform data operations in parallel with SQL Layer 103 operating to perform data operations. Stated otherwise, the database system depicted in FIG. 1 supports both SQL-based data operations and Data Layer interface-based data operations concurrently, while maintaining the ACID properties among operations requested via both the SQL and Data Layer interface mechanisms.

Data Layer Interface 104 can detect schema evolution, such as, adding/dropping columns, creating/deleting indexes. Such support for schema evolution is achieved through proper shared state invalidation mechanisms. Because the Data Layer Interface 104 needs to be ensured that a shared state represents the current state of the metadata, a special lock, a NULL LOCK, is associated with a shared state. The NULL LOCK is kept on the shared state when the shared state is not being used, and if the NULL LOCK is broken then that means the shared state needs to be regenerated. A full lock on the shared state data structure is needed for changing the shared state. A way to ensure that the shared state and the mutable state remain valid when constructing arguments for the Data Layer interface is to obtain a DML lock and verify that the NULL LOCK is valid immediately prior to constructing these arguments. Such a lock prevents the table from evolving while a DML operation is in progress.

Data Layer Interface 104 also supports supplemental redo logging, which places additional column data into a redo log whenever a data modification operation is performed. Stated otherwise, redo logging is another output of the Data Layer Interface 104. The supplemental redo logging data is needed by either a standby or a replicant site to replay the changes from the primary site to the replicant site and to detect update conflicts.

Data Layer Interface 104 can support Keys supplemental logging, where values of a primary key, unique or foreign keys are logged to a redo log. It also handles Conditional and Unconditional Log Groups. For Conditional Log Groups, the before images of the columns in the log group are logged to the redo log only when at least one column in the log group is changed. For Unconditional Log Groups, the before images of the columns in the log group are logged to the redo whenever the table is changed, regardless of whether the change affected any of the columns in the log groups.

To handle supplemental redo logging, a list of supplemental log groups is maintained in a shared state. During a call made to Data Layer Interface 104 to perform a DML operation, the Data Layer determines what columns to log based on the list of modified columns supplied in the call.

Data Layer Interface 104 also supports redo logging for bi-directional replication purposes. Stated otherwise, redo is another output of the Data Layer Interface 104. Thus, the primary key of the table being modified via a direct DML operation is logged, for shipping over to the standby database so that the standby database knows which rows to change in association with the direct DML operation. The Data Layer Interface 104 also maintains an undo log for correctness purposes, e.g., to help maintain the ACID properties. However, the undo log is less visible than the redo log because the undo is not necessarily shipped outside the primary database during replication as is the redo.

Performing an Operation Directly on Data in a Database

Figure 2:
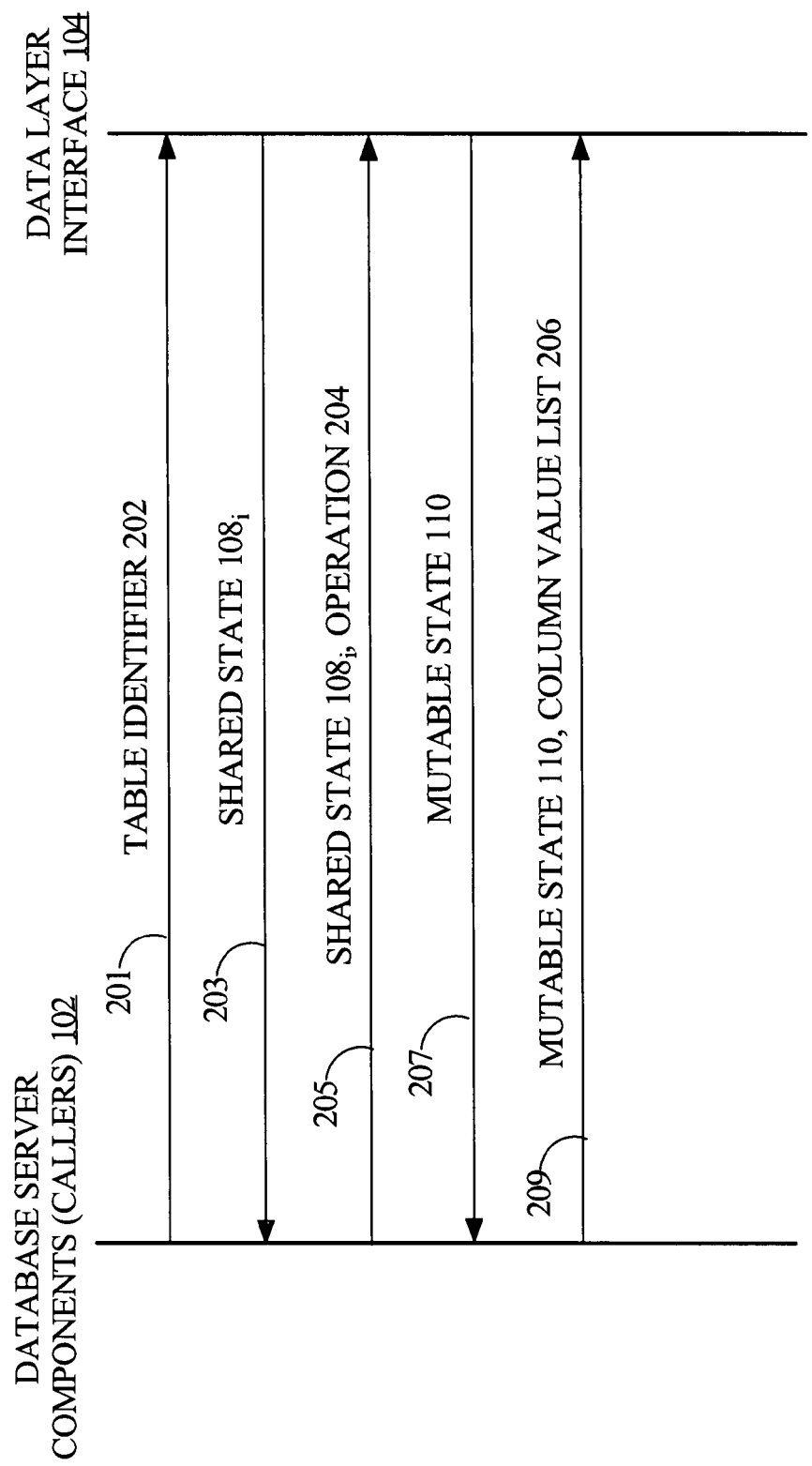
FIG. 2 is a diagram illustrating a process for performing an operation on data stored in a database, according to an embodiment of the invention.

FIG. 2 is a diagram illustrating a process for performing an operation on data stored in a database, according to an embodiment of the invention. The process depicted in FIG. 2 is a computer and/or machine-implemented method in which at least one computer or machine performs the process, such as by one or more processors executing instructions. For example, the method may be performed on or by a computer system such as computer system 300 of FIG. 3. The process depicted in FIG. 2 involves a DBMS component 102, a caller, calling into functions associated with Data Layer Interface 104, to directly manipulate a database table. FIG. 2 depicts the calls that DBMS components 102 can make to the Data Layer Interface 104, and the objects returned from Data Layer Interface 104 to the calling DBMS component 102.

If there is not already a shared state $108_i$ for a particular table on which a DBMS component 102 seeks to perform a DML operation, then the DBMS component 102 calls into the Data Layer Interface 104 passing in a table identifier 202, at call 201. In response to the call 201, the Data Layer Interface 104 creates and returns an opaque pointer to shared state $108_i$, at response 203. If a shared state $108_i$ already existed for the particular table on which a DBMS component 102 wants to perform a data manipulation operation (i.e., another session had already performed a call into the Data Layer Interface 104, which responded with a shared state), then the shared state does not have to be recreated. Only the opaque pointer need be returned to the calling DBMS component 102.

At call 205, the DBMS component 102 calls into the Data Layer Interface 104, passing in the shared state $108_i$ corresponding to the table affected by the operation and identifying the type of operation 204, e.g., INSERT, DELETE, or UPDATE. In response to the call 205, the Data Layer Interface 104 creates and returns a mutable state 110 that corresponds to the particular type of operation 204 and to the table affected by the operation, at response 207. According to an embodiment, different mutable states 110 are created and used for each respective type of operation 204, and each type of mutable state 110 is associated with a corresponding API or function via which the operation is performed directly on the Data Layer 106. Insert operations can be done in batch to improve data and index block accesses.

An approach for directly manipulating database data could be implemented differently than as shown in FIG. 2. For example, the parameters passed with calls 201 and 205 could effectively be combined into a single call, whereby the table identifier 202 and operation 204 are both passed into a Data Layer Interface 104 function. The Data Layer Interface 104 would in turn create a mutable state based thereon, bypassing the creation of a shared state $108_i$. Thus, each session's mutable state would be created from scratch without the use of a shared state that is shared among the processes.

At call 209, the DBMS component 102 calls into the Data Layer Interface 104, passing in the mutable state 110 corresponding to the table affected by the operation and column value list 206 which comprises the values corresponding to table columns affected by the operation, e.g., new values for an INSERT, new and old values for an UPDATE, and the like. In response to the call 209, the Data Layer Interface 104 performs the DML operation to the table. Thus, the process depicted in FIG. 2 provides a faster, better performing way to manipulate data stored in a database table, in comparison with the generation and compilation of SQL using SQL Layer 103 (FIG. 1).

Hardware Overview

Figure 3:
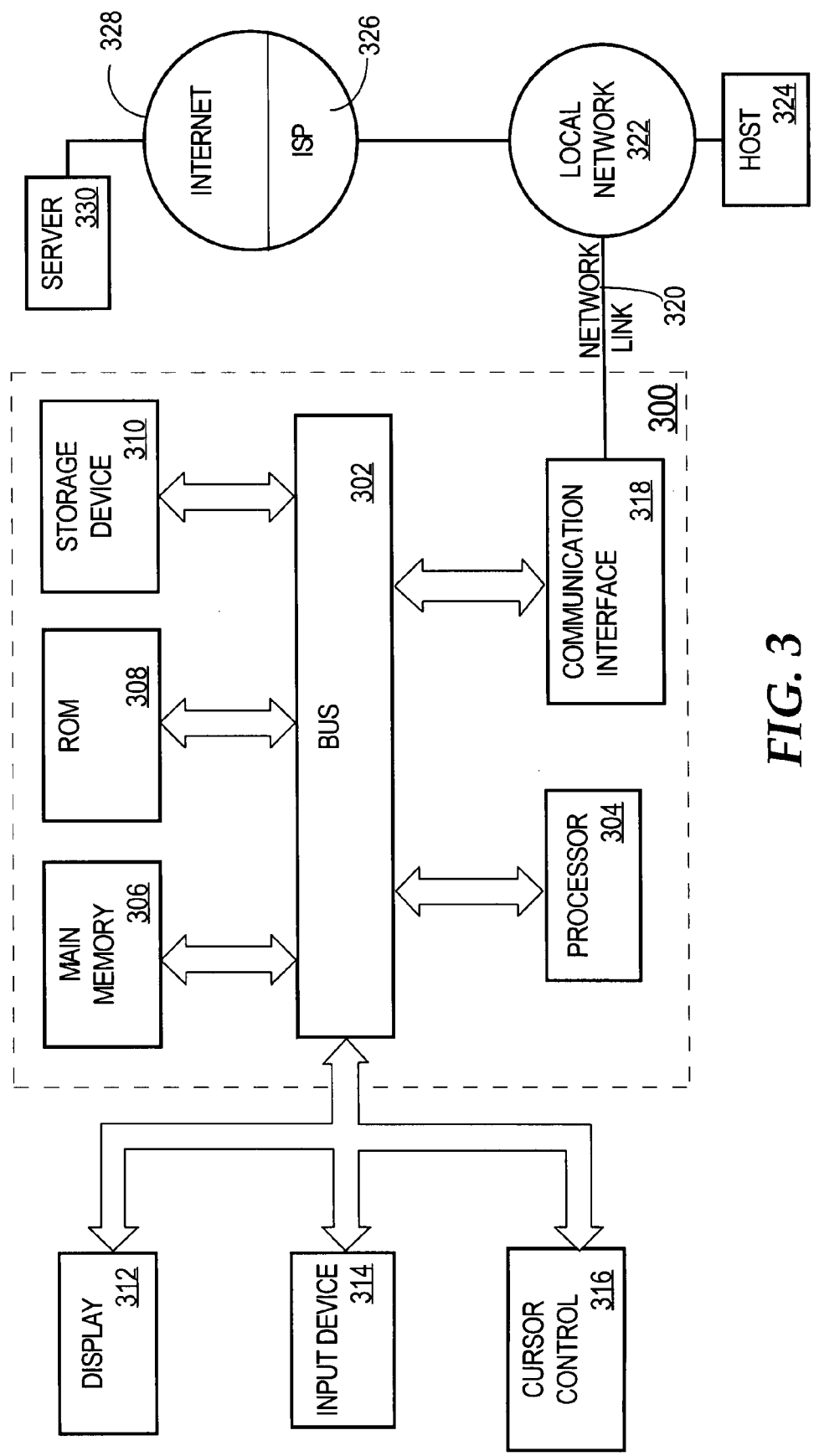
FIG. 3 is a block diagram that illustrates a computer system 300 upon which an embodiment of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Extensions and Alternatives

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader scope of embodiments of the invention. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A method for a database server to provide a data layer comprising software, said data layer not only being invocable by a SQL layer to perform DML operations but also invocable by another component of said database server to perform DML operations, comprising:

in response to receiving a DML statement, the SQL Layer of said database server invoking a Data Layer of the database server to perform a first DML operation to a table;

wherein the DML operation is required to compute said DML statement;

another component of said database server invoking said Data Layer via an API to perform a second DML operation to said table;

wherein said Data Layer API provides functions that may be invoked without the need of passing in a DML statement to the function;

wherein the functions provided by said Data Layer API are invoked for at least one of:
  a) to return a row that has a particular row-id;
  b) to return a row that has a particular value in a particular column; or
  c) to return row-ids of rows that have a particular key value in a key column of an index;

wherein the method is performed by one or more computing devices.

2. The method of claim 1, further including:

creating a mutable state data structure for containing data used as input for or output from performing a type of DML operation;

wherein said mutable state data structure comprises an amount of space allocated for storing data inputs and outputs of said second DML operation;

wherein said another component of said database server invoking said Data Layer includes passing in said mutable state data structure;

said another component of said database server invoking said Data Layer to perform a third DML operation to said table;

wherein said another component of said database server invoking said Data Layer to perform said third DML operation also includes passing in said mutable state data structure; and wherein said second DML operation and said third DML operation affect different columns.

3. The method of claim 2, wherein execution of said second DML operation entails storing first data in said mutable state data structure; and wherein execution of said third DML operation entails storing second data in said mutable data structure;

and said first data and said second data are not the same.

4. The method of claim 2, wherein said first DML operation and said second DML operation are a same particular type of DML operation, and wherein said mutable state data structure is specifically configured for said particular type of DML operation.

5. The method of claim 2, the steps further comprising:

before said another component of said database server invoking said Data Layer, said Data Layer creating a shared state data structure that stores metadata about said table, wherein said shared state data structure is shared among multiple processes; and wherein said shared state data structure is accessed during execution of the second DML operation and third DML operation.

6. The method of claim 5, wherein said another component of said database server creates said shared state data structure by invoking said API.

7. The method of claim 6, wherein said shared state data structure stores metadata about one or more indexes associated with said table.

8. A computer-implemented method for performing DML operations on data stored in a database, comprising:

within a database server, creating a mutable state data structure for containing data used as input for or output from performing a type of DML operation to a particular database table;

wherein said mutable state data structure comprises an amount of space allocated for storing data inputs and outputs of said type of DML operation on said particular database table;

creating a shared state data structure that stores metadata about said particular database table, wherein said shared state data structure is shared among multiple processes; and making a first call of a Data Layer interface to execute a first DML operation that accesses a first set of one or more columns of said table, wherein making said first call includes passing in said mutable state data structure and said shared state data structure;

making a second call of said Data Layer interface to execute a second DML operation that accesses a second set of one or more columns of said table that is different than said first set of one or more columns, wherein making said second call includes passing in said mutable state data structure and said shared state data structure;

wherein execution of said first DML operation entails storing first data in said mutable state data structure; and wherein execution of said second DML operation entails storing second data in said mutable state data structure;

wherein the method is performed by one or more computing devices.

9. The method of claim 8, wherein said first DML operation and said second DML operation are a same particular type of DML operation, and wherein said mutable state data structure is specifically configured for said particular type of DML operation.

10. The method of claim 9, wherein the amount of space allocated for storing data inputs and outputs of said second DML operation is determined based on the particular type of said second DML operation and data types of each column contained in said table.

11. The method of claim 8, wherein said shared state data structure is shared among multiple sessions; and wherein said creating said mutable state data structure comprises creating said mutable state data structure based on said shared state data structure.

12. The method of claim 11, wherein said creating said shared state data structure comprises creating said shared state data structure storing metadata about one or more indexes associated with said table.

13. A computer-readable volatile or non-volatile storage medium, storing one or more sequences of instructions which, when executed by one or more processors, cause the one or more processors to perform:

in response to receiving a DML statement, the SQL Layer of said database server invoking a Data Layer of the database server to perform a first DML operation to a table;

wherein the DML operation is required to compute said DML statement;

another component of said database server invoking said Data Layer via an API to perform a second DML operation to said table;

wherein said Data Layer API provides functions that may be invoked without the need of passing in a DML statement to the function;
wherein the functions provided by said Data Layer API are invoked for at least one of:
a) to return a row that has a particular row-id;
b) to return a row that has a particular value in a particular column; or
c) to return row-ids of rows that have a particular key value in a key column of an index;
wherein the method is performed by one or more computing devices.

14. The computer-readable volatile or non-volatile storage medium of claim 13, further including instructions which when executed cause the one or more processors to perform:
creating a mutable state data structure for containing data used as input for or output from performing a type of DML operation;
wherein said mutable state data structure comprises an amount of space allocated for storing data inputs and outputs of said second DML operation;
wherein said another component of said database server invoking said Data Layer includes passing in said mutable state data structure;
said another component of said database server invoking said Data Layer to perform a third DML operation to said table;
wherein said another component of said database server invoking said Data Layer to perform said third DML operation also includes passing in said mutable state data structure; and
wherein said second DML operation and said third DML operation affect different columns.

15. The computer-readable volatile or non-volatile storage medium of claim 14, wherein execution of said second DML operation entails storing first data in said mutable state data structure; and
wherein execution of said third DML operation entails storing second data in said mutable data structure;
and said first data and said second data are not the same.

16. The computer-readable volatile or non-volatile storage medium of claim 14, wherein said first DML operation and said second DML operation are a same particular type of DML operation, and wherein said mutable state data structure is specifically configured for said particular type of DML operation.

17. The computer-readable volatile or non-volatile storage medium of claim 14, further including instructions which when executed cause the one or more processors to perform:
before said another component of said database server invoking said Data Layer, said Data Layer creating a shared state data structure that stores metadata about said table, wherein said shared state data structure is shared among multiple processes; and
wherein said shared state data structure is accessed during execution of the second DML operation and third DML operation.

18. The computer-readable volatile or non-volatile storage medium of claim 17, wherein said another component of said database server creates said shared state data structure by invoking said API.

19. The computer-readable volatile or non-volatile storage medium of claim 18, wherein said shared state data structure stores metadata about one or more indexes associated with said table.

20. A computer-readable volatile or non-volatile storage medium, storing one or more sequences of instructions which, when executed by one or more processors, cause the one or more processors to perform:
within a database server, creating a mutable state data structure for containing data used as input for or output from performing a type of DML operation to a particular database table;
wherein said mutable state data structure comprises an amount of space allocated for storing data inputs and outputs of said type of DML operation on said particular database table;
creating a shared state data structure that stores metadata about said particular database table, wherein said shared state data structure is shared among multiple processes; and
making a first call of a Data Layer interface to execute a first DML operation that accesses a first set of one or more columns of said table, wherein making said first call includes passing in said mutable state data structure and said shared state data structure;
making a second call of said Data Layer interface to execute a second DML operation that accesses a second set of one or more columns of said table that is different than said first set of one or more columns, wherein making said second call includes passing in said mutable state data structure and said shared state data structure;
wherein execution of said first DML operation entails storing first data in said mutable state data structure; and
wherein execution of said second DML operation entails storing second data in said mutable state data structure;
wherein the method is performed by one or more computing devices.

21. The computer-readable volatile or non-volatile storage medium of claim 20, wherein said first DML operation and said second DML operation are a same particular type of DML operation, and wherein said mutable state data structure is specifically configured for said particular type of DML operation.

22. The computer-readable volatile or non-volatile storage medium of claim 21, wherein the amount of space allocated for storing data inputs and outputs of said second DML operation is determined based on the particular type of said second DML operation and data types of each column contained in said table.

23. The computer-readable volatile or non-volatile storage medium of claim 20, wherein said shared state data structure is shared among multiple sessions; and
wherein said creating said mutable state data structure comprises creating said mutable state data structure based on said shared state data structure.

24. The computer-readable volatile or non-volatile storage medium of claim 23, wherein said creating said shared state data structure comprises creating said shared state data structure storing metadata about one or more indexes associated with said table.

* * * * *